March 27, 1928.
H. M. PFLAGER
1,663,727
BOOSTER MOTOR TRUCK
Filed March 23, 1926
2 Sheets-Sheet 2
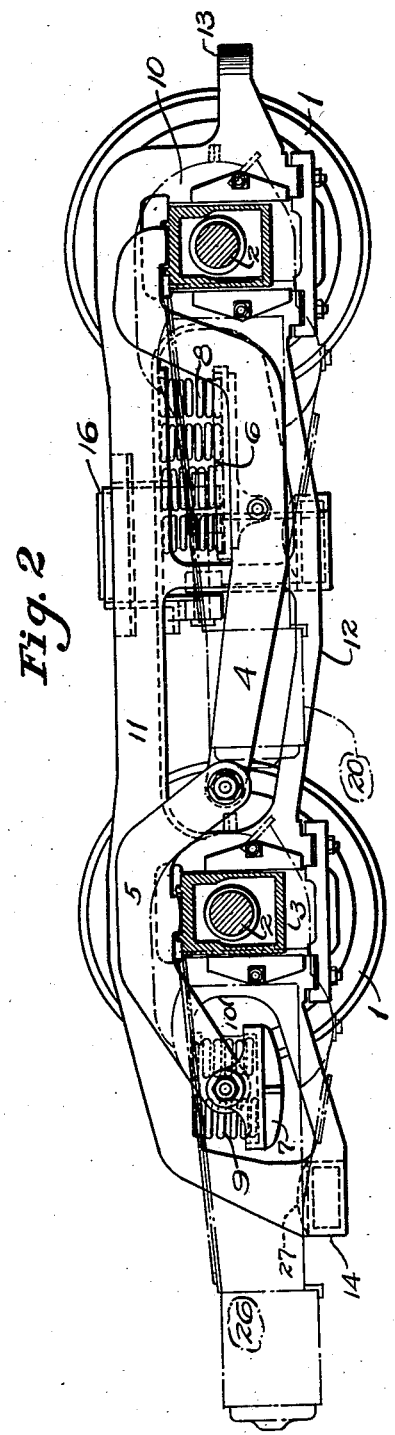
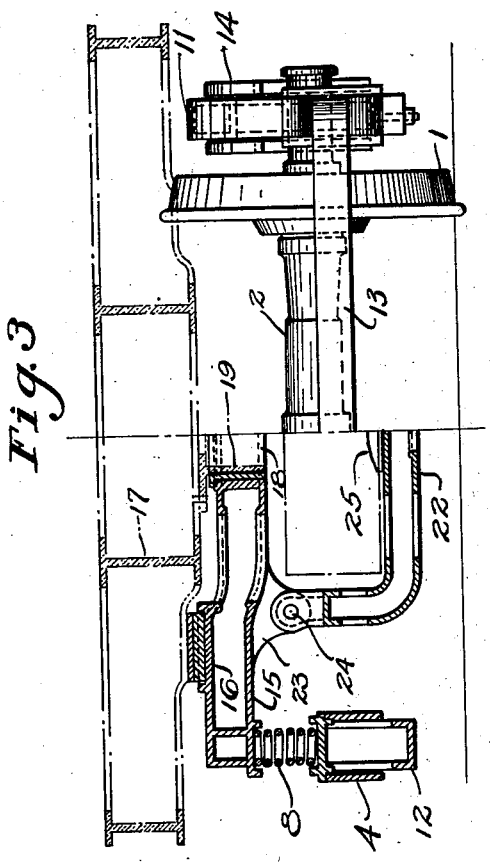
Inventor
Harry M. Pflager
By Cornwall, Bedell & James
Attys Patented Mar. 27, 1928.

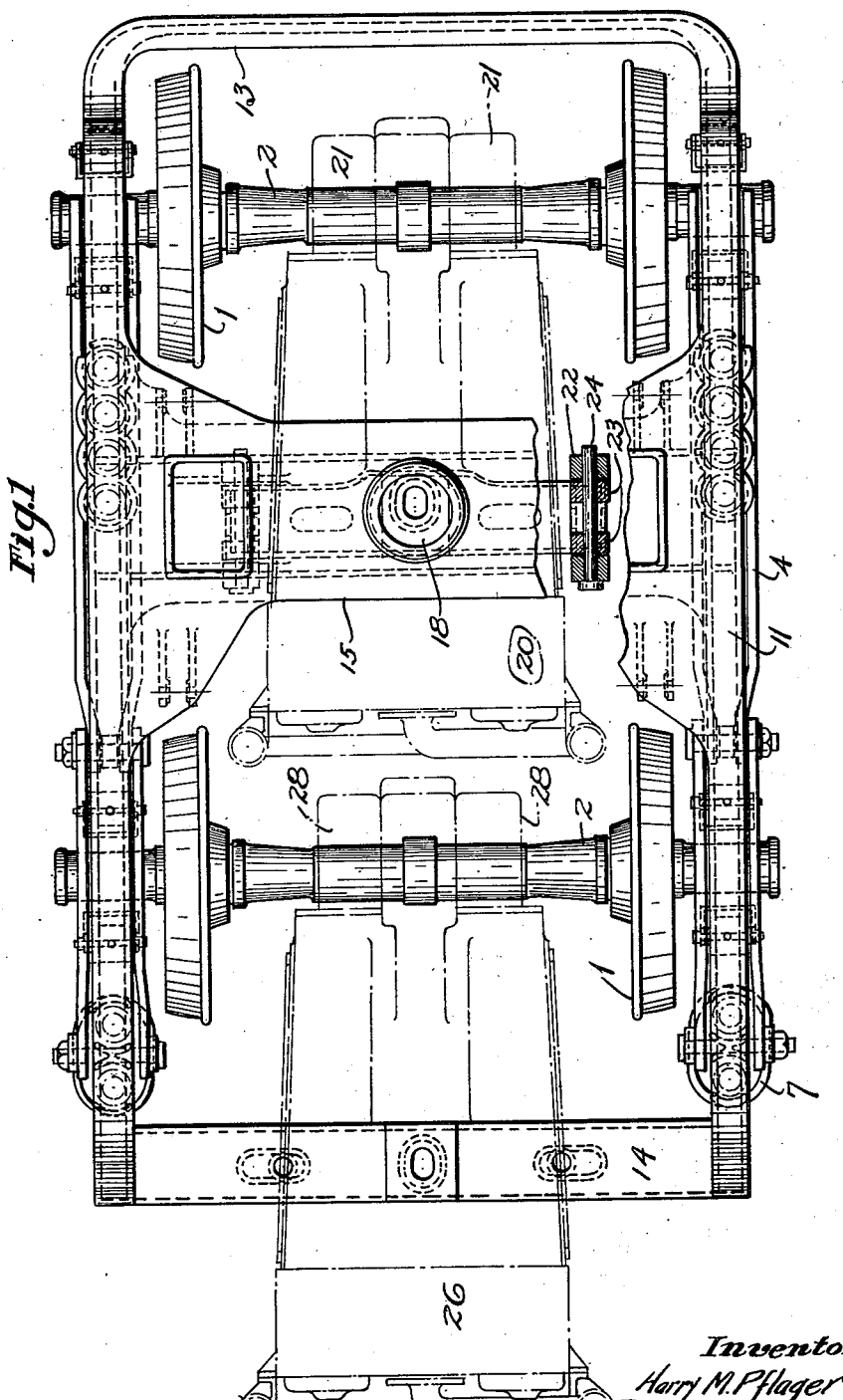

1,663,727

UNITED STATES PATENT OFFICE.

HARRY M. PFLAGER, OF ST. LOUIS, MISSOURI, ASSIGNOR TO COMMONWEALTH STEEL COMPANY, OF ST. LOUIS, MISSOURI, A CORPORATION OF NEW JERSEY.

BOOSTER-MOTOR TRUCK.

Application filed March 23, 1926. Serial No. 96,731.

My invention relates to railway rolling stock and consists in an improved truck particularly adapted to be equipped with booster motor or motors.

It is a growing practice to equip railway locomotives with auxiliary engines which are called into service when the locomotive is starting or is laboring under a heavy load, for instance, on a steep grade. Heretofore, such equipment has been almost entirely confined to the application of booster engines to the trailing axle of the locomotive and the motor has been supported either upon the frame of a trailer truck which includes the axle or the motor has been suspended from the rear end of the locomotive frame.

In many instances, it is desirable to relieve the trailing truck frame or the rear end of the locomotive from such additional weight and it has been proposed to carry the booster motor upon one of the tender trucks.

In my copending application, Serial No. 46,088, I illustrate and describe such a booster motor application and in my present application I utilize some of the features of the same. My present invention consists in improvements in and additions to the subject-matter of the above-mentioned application.

One of the objects of my present invention is to support a booster motor from the bolster of a truck frame which is spring-supported upon the truck axles and therefore the booster motor is spring-supported instead of being a dead weight on the axles. Such a mounting involves the solution of problems arising out of the additional space requirements beneath the bolster and another object of my invention is to provide a bolster which is adapted to have a booster motor applied thereto, as indicated.

Another object of my invention is to provide a truck having a plurality of axles with a plurality of booster motors operatively connected to the respective axles and to distribute the weight of the booster motors and the superstructure load to the truck in such a manner that the axles will carry equal loads or will carry loads in some other predetermined ratio.

Another object of my invention is to eliminate the side rods used to connect driving wheels where only one axle and its wheels are operated by the motor. This solves many problems in connection with design of wheels and adjacent truck parts and arising from the necessity of providing suitable clearances between relatively moving parts.

In the accompanying drawings which illustrate a selected embodiment of my invention—

Figure 1 is a top view of a four wheel truck, each axle of which is operatively connected to an individual booster motor.

Figure 2 is a side elevation of the structure shown in Figure 1.

Figure 3 is in part an end elevation and in part a transverse vertical section through the truck.

The truck includes the usual wheels 1, axles 2, and journal boxes 3. Equalizers 4 and 5 are mounted on boxes 3 and carry seats 6 and 7 for the truck springs 8 and 9, respectively.

The truck frame is supported upon springs 8 and 9 and is here indicated as comprising pedestals 10, wheel pieces 11, pedestal ties 12, end transoms 13 and 14, and an intermediate transom or bolster member 15. The latter member is provided with side bearings 16 on which the superstructure frame 17, indicated in broken lines, is carried, the central portion of the bolster 15 being provided with an opening 18 for receiving a centering member 19 on the superstructure frame, but this portion of the bolster is not adapted to carry any of the superstructure load. This enables the bolster to be made comparatively shallow intermediate its ends and thereby provides room beneath the bolster for a booster motor and its frame which I indicate generally by the numeral 20. The forward end of this booster motor frame is provided with spaced bearings 21 on the righthand axle of the truck and at a point spaced from said bearings the motor and frame is carried by a yoke 22 which is suspended from ears 23 on the bolster 15 by means of pins 24.

The bearing on yoke 22 for the booster motor preferably is located at the center of the truck and motor and consists of a spherical shaped boss 25, the corresponding portion of the motor having a similarly shaped recess. This bearing permits the motor and its frame to tilt and turn with its axle 2 and relatively to the yoke 22 and forms a substantially universal joint between the booster and the yoke.

A second booster motor and frame indicated generally by the numeral 26 is operatively connected to the lefthand axle 2 of the truck and extends outwardly of the truck from said axle and over the end transom 14. Transom 14 is also provided preferably with a single bearing 27 for the motor 26 which bearing corresponds to bearing 25 and permits the booster to tilt universally relative to the frame and transom.

By suitable location of the bolster 15 relative to the frame supports and by properly proportioning the other parts of my structure, I can distribute the weight of the superstructure load and the weight of the booster motors so that each axle carries the same load. I prefer that this load shall be carried by the axles almost entirely through their journal boxes and that very little of the weight of the booster motor be carried by the axles through the bearings 21 or 28. There is, therefore, very little unsprung weight on the axles.

Obviously, the truck could be equipped with a single booster supported from the bolster without the presence of the lefthand booster carried by the rear transom, and, of course, the lefthand booster could be applied to the truck, without the righthand booster, as described in my above-mentioned copending application. With my preferred construction, however, utilizing both booster motors more power can be delivered to the truck wheels and side connecting rods are eliminated.

The many details of my invention may be varied without departing from the spirit of the same, and I contemplate the use of such modifications and equivalents as may be suggested in the commercial development of my invention and as fall within the scope of my claims.

I claim:

1. A railway truck frame having a bolster member and a booster motor support carried by said bolster, said support comprising a single spherical-shape bearing beneath the space occupied by the motor adapted to accommodate universal tilting of a motor mounted thereon.

2. In a railway truck, a bolster member having a body swiveling element and provided with a booster motor ball and socket support member located centrally of the truck beneath said body swiveling element, said support member being arranged to permit free tilting of a motor mounted thereon.

3. In a railway truck frame, a bolster member having side bearings, and a booster support between said side bearings and carried by said bolster at points adjacent to said side bearings.

4. In combination, a railway truck bolster member having body supporting side bearings, and a booster motor support element carried by said member below the level of said side bearings and at points adjacent to said side bearings.

5. In combination, a railway truck bolster member having body supporting side bearings and a body swiveling element between said bearings, and a booster motor ball and socket support element carried by said member below said swiveling element and permitting free tilting of a motor mounted thereon.

6. In a railway truck, a bolster member, depending ears on said member, and a booster motor supporting yoke detachably secured to said ears.

7. A one-piece truck frame including a bolster with load supporting side bearing portions, and depending ears below said portions for supporting a booster motor carrying member.

8. In combination, a railway truck axle, a truck bolster member, and a booster engine of the reciprocal type extending beneath said bolster with its frame having one end mounted on said axle and having a portion spaced from said end mounted on said bolster member at the sides of said motor and near the ends of said bolster member.

9. In a railway truck, an axle, a spring supported frame including a bolster member intermediate the ends of the frame, an element detachably secured to said bolster, and a booster motor operatively connected to said axle with substantially all of its weight carried by said element through a bearing adapted to accommodate universal tilting of said motor.

10. In a railway truck, an axle, a spring supported frame including a bolster member spaced from said axle longitudinally of the truck, a booster motor frame extending from said axle and beneath said bolster and beyond the latter and supported by the latter, and a booster motor mounted on said motor frame so that substantially all of the booster motor weight is carried by said bolster.

11. In a railway truck, an axle, a spring supported frame including a bolster member spaced from said axle longitudinally of the truck, a booster motor frame having spaced bearings on said axle and extending therefrom beneath said bolster and supported by the latter on a single bearing providing for universal pivoting of said motor frame relative to said bolster, and a booster motor on said motor frame, said bolster bearing supporting substantially all of the weight of said motor frame and motor.

12. In a railway track, a frame including a bolster member and a transom member, a booster motor having substantially all of its weight carried by said bolster member, and a booster motor having substantially all of its weight carried by said transom.

13. In a railway truck, a frame including a bolster member and a transom member, spaced axles, a booster motor having substantially all of its weight carried by said bolster member and connected to one of said axles, and a booster motor having substantially all of its weight carried by said transom and connected to the other of said axles.

14. In a railway truck, spaced axles, a truck frame including a bolster member, a booster motor frame mounted on one axle and extending therefrom beneath said bolster member and having substantially all of its weight carried by the latter, and a booster motor frame mounted on the other of said axles and extending therefrom toward the adjacent end of said truck frame and having substantially all of its weight carried by the latter.

15. In a railway truck, spaced axles, a truck frame having end transoms and a bolster intermediate said axles, a booster motor frame mounted on one of said axles and extending toward the other of said axles and carried by said bolster member, a booster motor mounted on the other of said axles and extending toward the end of said truck frame and carried by one of said transoms, equalizers pivoted to each other and mounted on said axles, and springs supporting said truck frame from said equalizers.

16. In a railway truck, spaced axles, an individual booster motor for each of said axles, and an individual single support for each of said motors beneath its center of gravity at a point spaced from its respective axle.

17. In a railway truck, spaced axles, an individual booster motor for each of said axles, and an individual universal joint support for each of said motors beneath its center of gravity at a point spaced from its respective axle.

18. In a railway truck, spaced axles, a truck frame including a bolster member, an individual booster motor for each of said axles, and individual universal joint supports on said frame and bolster, respectively, for said motors.

19. In a railway truck, spaced axles, journal boxes, equalizers resting thereon, springs on said equalizers, a truck frame carried by said springs and including a bolster member, a booster motor carried by said frame and operatively connected to one of said axles, and a booster motor carried by said bolster member and operatively connected to the other of said axles.

20. In a railway truck, spaced axles, equalizers, a frame carried on said equalizers and including a bolster member, and individual motors for said axles carried on said frame and bolster member, the supports for said motors being so located that the weight thereof and the weight of the superstructure supported by the bolster is equally distributed to said axles.

In testimony whereof I hereunto affix my signature this 19 day of March, 1926.

H. M. PFLAGER.